US007050882B1

United States Patent
Indou et al.

(10) Patent No.: US 7,050,882 B1
(45) Date of Patent: May 23, 2006

(54) METHOD OF CONTROLLING WORKING CONDITIONS OF A LASER WORKING MACHINE AND A COMPUTER-READABLE STORAGE MEDIUM

(75) Inventors: Kouichi Indou, Tokyo (JP); Masato Matsubara, Tokyo (JP); Hideki Kimata, Nagoya (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/959,119

(22) PCT Filed: Apr. 27, 1999

(86) PCT No.: PCT/JP99/02227

§ 371 (c)(1),
(2), (4) Date: Oct. 19, 2001

(87) PCT Pub. No.: WO00/64621

PCT Pub. Date: Nov. 2, 2000

(51) Int. Cl.
*G06F 19/00* (2006.01)
*B23K 26/00* (2006.01)

(52) U.S. Cl. .............. 700/166; 219/121.6; 219/121.61; 219/121.62; 250/492.1

(58) Field of Classification Search ................ 700/166; 250/492.1; 219/121.6, 121.65, 121.68, 121.69, 219/121.73, 121.76, 121.8, 121.82, 121.83, 219/121.61, 121.62; 372/30, 31, 32, 33
See application file for complete search history.

(56) References Cited

U.S. PATENT DOCUMENTS

| | | | |
|---|---|---|---|
| 5,065,329 A | | 11/1991 | Yamazaki et al. |
| 5,408,482 A | * | 4/1995 | Nagano et al. ................ 372/31 |
| 5,670,067 A | * | 9/1997 | Koide et al. ............ 219/121.68 |
| 5,946,332 A | * | 8/1999 | Terao ........................... 372/33 |
| 5,960,405 A | * | 9/1999 | Trefethan et al. ............ 700/108 |
| 6,008,497 A | * | 12/1999 | Mizoguchi et al. ....... 250/492.1 |

FOREIGN PATENT DOCUMENTS

| | | |
|---|---|---|
| JP | SHO 60-255295 | 12/1985 |
| JP | SHO 62-77687 | 5/1987 |
| JP | SHO 63-196904 | 8/1988 |
| JP | A 4-17986 | 1/1992 |
| JP | A 4-52091 | 2/1992 |
| JP | A 4-289055 | 10/1992 |
| JP | A 10-109185 | 4/1998 |
| JP | A 11-19786 | 1/1999 |

OTHER PUBLICATIONS

Chinese Office Action and an English translation for 99816586.7 dated Nov. 22, 2002.

* cited by examiner

*Primary Examiner*—Leo Picard
*Assistant Examiner*—Charles Kasenge
(74) *Attorney, Agent, or Firm*—Sughrue Mion, PLLC

(57) ABSTRACT

When a working condition is set, if an operator sets the working condition, a control device (1) obtains an expected load factor of a laser oscillator (2) based on the set working condition, and displays the load factor as a working condition check bar (8) on a display device (3). The operator adjusts the working condition so that a load factor of the laser oscillator (2) stays within a predetermined range while watching the working condition check bar (8) and determines an appropriate working condition. Therefore, it is possible to prevent excessive load from being applied to the laser oscillator (2) at the time of actual working.

6 Claims, 5 Drawing Sheets

| No. | CURRENT | FREQUENCY | PULSE WIDTH | PULSE NUMBER | WORKING MODE |
|---|---|---|---|---|---|
| 1 | $S_1$ | $T_1$ | $W_1$ | $N_1$ | M |
| 2 | $S_2$ | $T_2$ | $W_2$ | $N_2$ | C |
| 3 | $S_3$ | $T_3$ | $W_3$ | $N_3$ | P |
| ⋮ | ⋮ | ⋮ | ⋮ | ⋮ | ⋮ |
| 10 | $S_{10}$ | $T_{10}$ | $W_{10}$ | $N_{10}$ | P |

8 WORKING CONDITION CHECK BAR

FIG.3
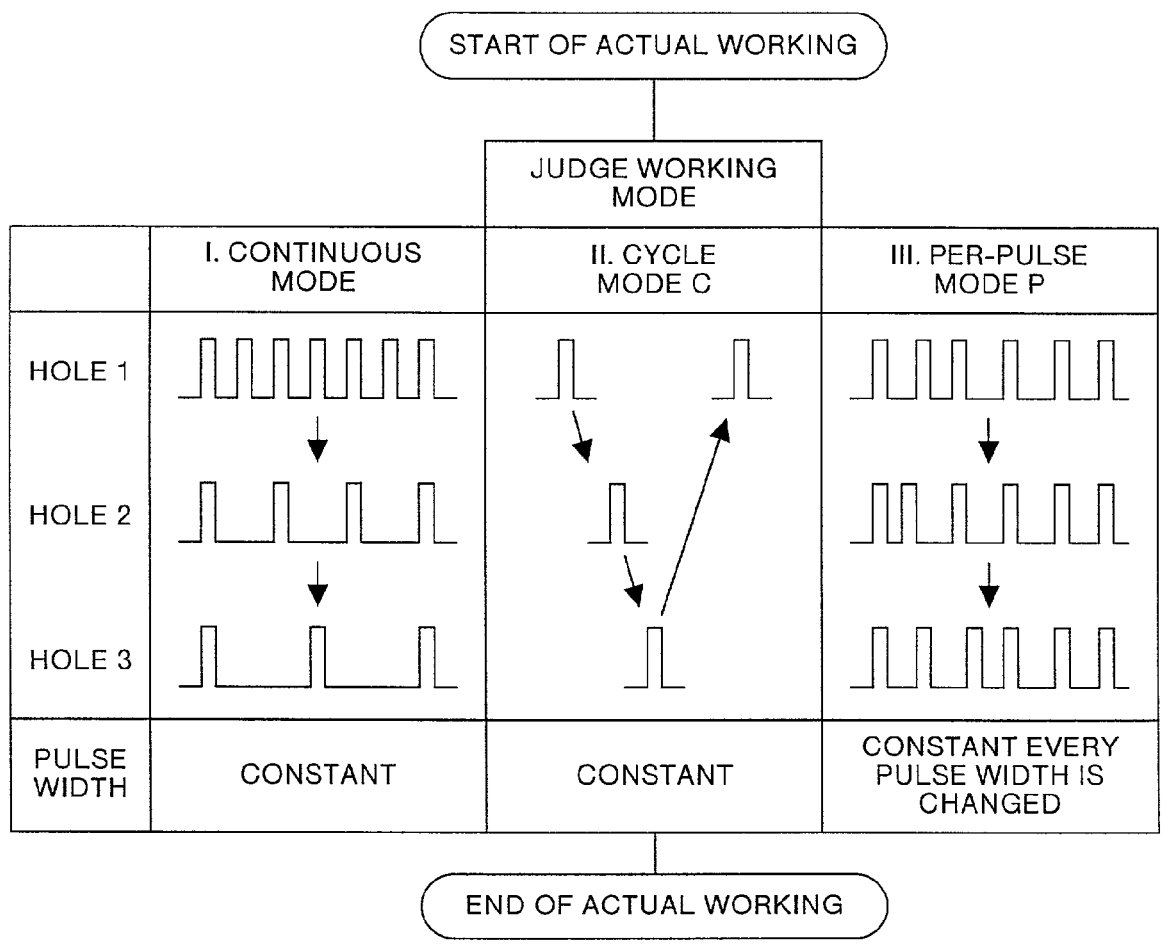
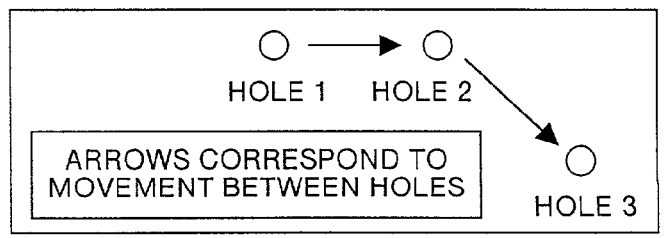

FIG.5

| No. | CURRENT | FREQUENCY | PULSE WIDTH | PULSE NUMBER |
|---|---|---|---|---|
| 1 | $S_1$ | $T_1$ | $W_1$ | $N_1$ |
| 2 | $S_2$ | $T_2$ | $W_2$ | $N_2$ |
| 3 | $S_3$ | $T_3$ | $W_3$ | $N_3$ |
| ⋮ | ⋮ | ⋮ | ⋮ | ⋮ |
| 10 | $S_{10}$ | $T_{10}$ | $W_{10}$ | $N_{10}$ |

METHOD OF CONTROLLING WORKING CONDITIONS OF A LASER WORKING MACHINE AND A COMPUTER-READABLE STORAGE MEDIUM

TECHNICAL FIELD

The present invention relates a method of controlling working conditions of a laser working machine and a computer-readable storage medium storing a computer program for the method according to the present invention.

BACKGROUND ART

Conventionally, when a printed-circuit board is bored by pulse oscillating laser, a current value S of drive current to be supplied to a laser oscillator, a frequency T of pulse oscillation, a pulse width W and pulse number N are set as working condition. The current value S, the frequency T of pulse oscillation, the pulse width W and the pulse number N are variously changed, and stored in a working condition file as working condition. The working condition file is stored and saved in a computer-readable storage medium, such as a magnetic tape, a floppy disk, a hard disk and a magneto-optic disk, each of them being connected to a control device of the laser working machine.

FIG. 5 shows an example of display showing a setting screen of a working condition setting device (not shown) in conventional laser working machine. A list 9 of the working condition file as shown in FIG. 5 is displayed on the setting screen of the working condition setting device (not shown). An operator of the laser working machine watches this list and operates a not shown input unit and inputs the working condition. In the example shown in FIG. 5, a first working condition for example is set to current value $S_1$ frequency $T_1$, pulse width $W_1$ and pulse number $N_1$, a second working condition is set to current value $S_2$, frequency $T_2$, pulse width $W_2$ and pulse number $N_2$, and a third working condition is set to current value $S_3$, frequency $T_3$, pulse width $W_3$, and pulse number $N_3$. In a fourth and subsequent working conditions also, current value S, frequency T, pulse width W and pulse number N are similarly set.

At the time of actual working, the control device reads out a working program from the storage medium or another computer-readable storage medium connected to the control device, and executes the program. The control device then reads out an appropriate working condition from the working condition file based on a working condition number (number in the column of "No." of the list in FIG. 5) and a working mode, and supplies drive current of the current value S such that N-number of laser pulses having frequency T and pulse width W to the laser oscillator. The laser oscillator oscillates laser by the supplied drive current for working.

In this prior art, however, values of the current value S, frequency T, pulse width W and pulse number N can be input up to an upper limit predetermined in the working condition setting device of the laser working machine independently without being affected by other set value and therefor, there is an adverse possibility that a load acting on the laser oscillator exceeds a permissible load range depending upon a combination of the values of the current value S, frequency T, pulse width W and pulse number N.

Thus, in the prior art, the laser oscillator is operated beyond the permissible range of the load in some cases, or the laser oscillator is operated for a long time with a load which is within the permissible range but close to the upper limit in some cases, and there is a problem that parts constituting the laser oscillator are worn and deteriorated soon.

Further, when the working condition is newly set, in order to find out an appropriate working condition capable of working efficiently without applying excessive load to the laser oscillator, it is necessary to repeat working operation while variously changing the working condition and checking operation of balance between the load on the laser oscillator and the working efficiency. Therefore, there is a problem that extremely long time and enormous labor are required to finally determine the working condition.

The present invention has been accomplished to solve the above problems, and it is an object of the invention to provide a working condition control method of a laser working machine and a computer-readable storage medium storing a program for the method capable of easily setting a working condition of laser working such that a load acting on a laser oscillator stays in an appropriate range.

DISCLOSURE OF THE INVENTION

The working condition control method of a laser working machine for setting a working condition for driving a laser oscillator of according to the present invention comprises the steps of inputting the working condition, obtaining an expected load of the laser oscillator concerning a condition in which a load may be applied to the laser oscillator with respect to the input working condition, and displaying the obtained expected load.

According to this invention, when if operator inputs a working condition, an expected load of the laser oscillator is obtained based on the input working condition, and the expected load is displayed on the display device.

In this invention, the working condition includes a working mode for defining a current value for driving the laser oscillator, frequency, pulse width and pulse number of laser output, and an irradiation pattern of laser pulse light to one or more to-be worked portions.

According to this invention, the working condition of the laser working machine is determined based on the driving current of the laser oscillator, the frequency, the pulse width, the pulse number of the laser output, and the working mode.

In this invention, the expected load is a function of a total sum of the current value, the frequency, the pulse width and the pulse number.

According to this invention, the expected load of the laser oscillator is obtained based on the total sums of the driving current of the laser oscillator, the frequency, the pulse width, and the pulse number of the laser output.

A computer-readable storage medium storing a program for setting a working condition for driving a laser oscillator of a laser working machine according to the present invention comprises the steps of: inputting the working condition, obtaining an expected load of the laser oscillator concerning a condition in which a load may be applied to the laser oscillator with respect to the input working condition, and displaying the obtained expected load.

According to this invention, the control device of the laser working machine reads out the program for setting the working condition from the storage medium and executes the program, thereby obtaining the expected load of the laser oscillator with respect to the working condition input by the operator, and the expected load is displayed on the display device.

In this invention, the working condition includes a working mode for defining a current value for driving the laser oscillator, frequency, pulse width and pulse number of laser output, and an irradiation pattern of laser pulse light to one or more to-be worked portions.

According to this invention, the working condition of the laser working machine is determined based on the driving current of the laser oscillator, the frequency, the pulse width, the pulse number of the laser output, and the working mode.

In this invention, the expected load is a function of a total sum of the current value, the frequency, the pulse width and the pulse number.

According to this invention, the expected load of the laser oscillator is obtained based on the total sums of the driving current of the laser oscillator, the frequency, the pulse width, and the pulse number of the laser output.

BRIEF DESCRIPTION OF THE DRAWINGS

FIG. 3 is a flowchart for boring a printed-circuit board by a pulse oscillating laser;

FIG. 5 is a schematic diagram showing a setting screen for setting the working condition in a conventional laser working machine.

BEST MODE FOR CARRYING OUT THE INVENTION

Embodiment/s for carrying out the invention will be explained in detail below with reference to FIG. 1 to FIG. 4.

Figure 1:
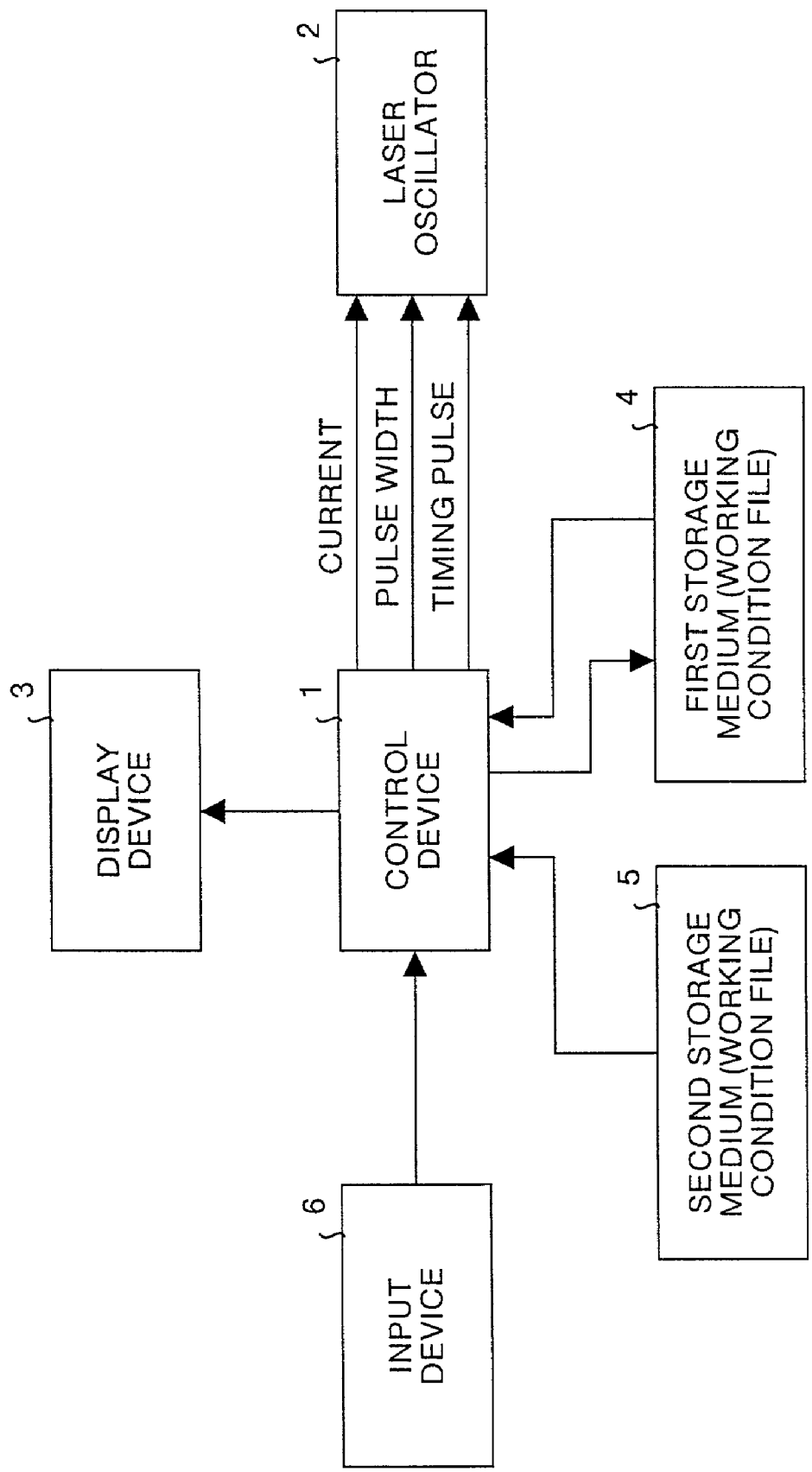
FIG. 1 is a block diagram showing an outline structure of a laser working machine to which the present invention is applied.

FIG. 1 is a block diagram showing an outline structure of a laser working machine to which the present invention is applied. The laser working machine comprises a control device 1, a laser oscillator 2, a display device 3 for displaying an index indicative of a load factor of the laser oscillator 2 when the working condition is set, a first storage medium 4 for storing the working condition file comprising set working conditions, a second storage medium 5 for storing a working program, and an input device 6 for inputting the working condition by operation of an operator.

The first storage medium 4 is a computer-readable storage medium such as a writable and readable nonvolatile semiconductor memory, a magnetic tape, a floppy disk, a hard disk and a magneto-optic disk. The second storage medium 5 is a computer-readable storage medium such as an nonvolatile semiconductor memory, a magnetic tape, a floppy disk, a hard disk and a magneto-optic disk.

The control device 1 reads out a appropriate working condition corresponding to a working condition number, and a working mode described in the working program from the working condition file, and based on the working condition, the control device 1 outputs a drive current, a pulse width and a timing pulse, thereby controlling the operation of a laser oscillator 2. Here, the timing pulse is a timing (frequency) when the laser oscillator 2 actually outputs in accordance with the set working condition.

Figure 2:
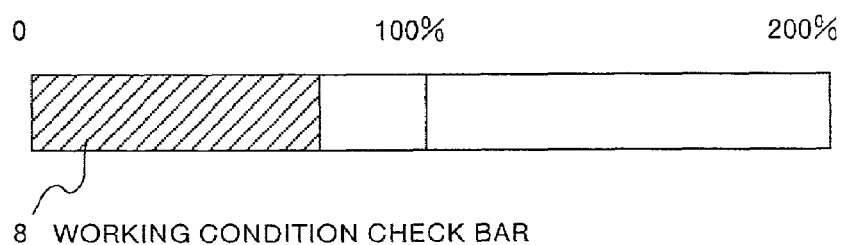
FIG. 2 is a schematic diagram showing one example of a setting screen for setting a working condition.

FIG. 2 shows a display example of a setting screen displayed on the display device 3 when the working condition is set. A list 7 of the working condition files and a working condition check bar 8 which is an index indicative of a load factor of the laser oscillator 2 are displayed on the setting screen. As shown in FIG. 2, in this embodiment, each working condition comprises current value S, frequency T, pulse width W, pulse number N and working m ode. In a working mode column for example, characters such as "M", "C" and "P" indicative of types of modes are displayed. "M" is a continuous mode, "C" is cycle mode and "P" is per-pulse mode. These modes will be described later.

In the display example shown in FIG. 2, for example a first working condition is set to current value $S_1$, frequency $T_1$, pulse width $W_1$, pulse number $N_1$ and working mode "M". A second working condition is set to current value $S_2$, frequency $T_2$, pulse width $W_2$, pulse number $N_2$ and working mode "C". A third working condition is set to current value $S_3$, frequency T, pulse width W, pulse number N and working mode "P". In a fourth and subsequent working conditions also, current value S, frequency T, pulse width W, pulse number N and working mode are similarly set.

The working condition check bar 8 is not especially limited, but as shown in FIG. 2 for example, the bar 8 comprises a band-like display portion, a color of a portion of the display portion is changed over a length determined in accordance with the load factor of the laser oscillator 2 so that the load factor of the laser oscillator 2 can visually be grasped. The working condition check bar 8 can display up to a load factor corresponding to 200% based on a definition that a permissible maximum value of the load factor of the laser oscillator 2 is 100%.

Next, the working mode will be explained. FIG. 3 is a flowchart for boring the printed-circuit board by means of the pulse oscillating laser. When the actual working is started, the control device 1 first judges the working mode, and in accordance with the working mode, three holes (hole 1, hole 2 and hole 3) are bored for example. The continuous mode M is a pattern in which a pulse width is set constant and the hole 1 is bored and then, the hole 2 is bored and then, the hole 3 is bored. In this pattern, it is necessary to bore the holes while cooling so that excessive load is not applied to the laser oscillator 2, and as the boring operation proceeds from hole 1 to hole 3, the pulse interval is widened. The cycle mode C is a pattern in which the pulse width is set constant, and the holes 1 to 3 are bored while moving one pulse by one pulse. In this pattern, there is a moving time of the laser oscillator 2 after one pulse laser is oscillated, and during this moving time, the laser oscillator 2 is cooled. Therefore, it is unnecessary to widen the pulse interval as the working proceeds unlike the continuous mode M. The per-pulse mode P is a pattern in which pulse width is changed every time, and the hole 1 is bored and then, the hole 2 is bored and then, the hole 3 is bored. In this pattern, the pulse width is changed, thereby cooling the laser oscillator 2.

Figure 4:
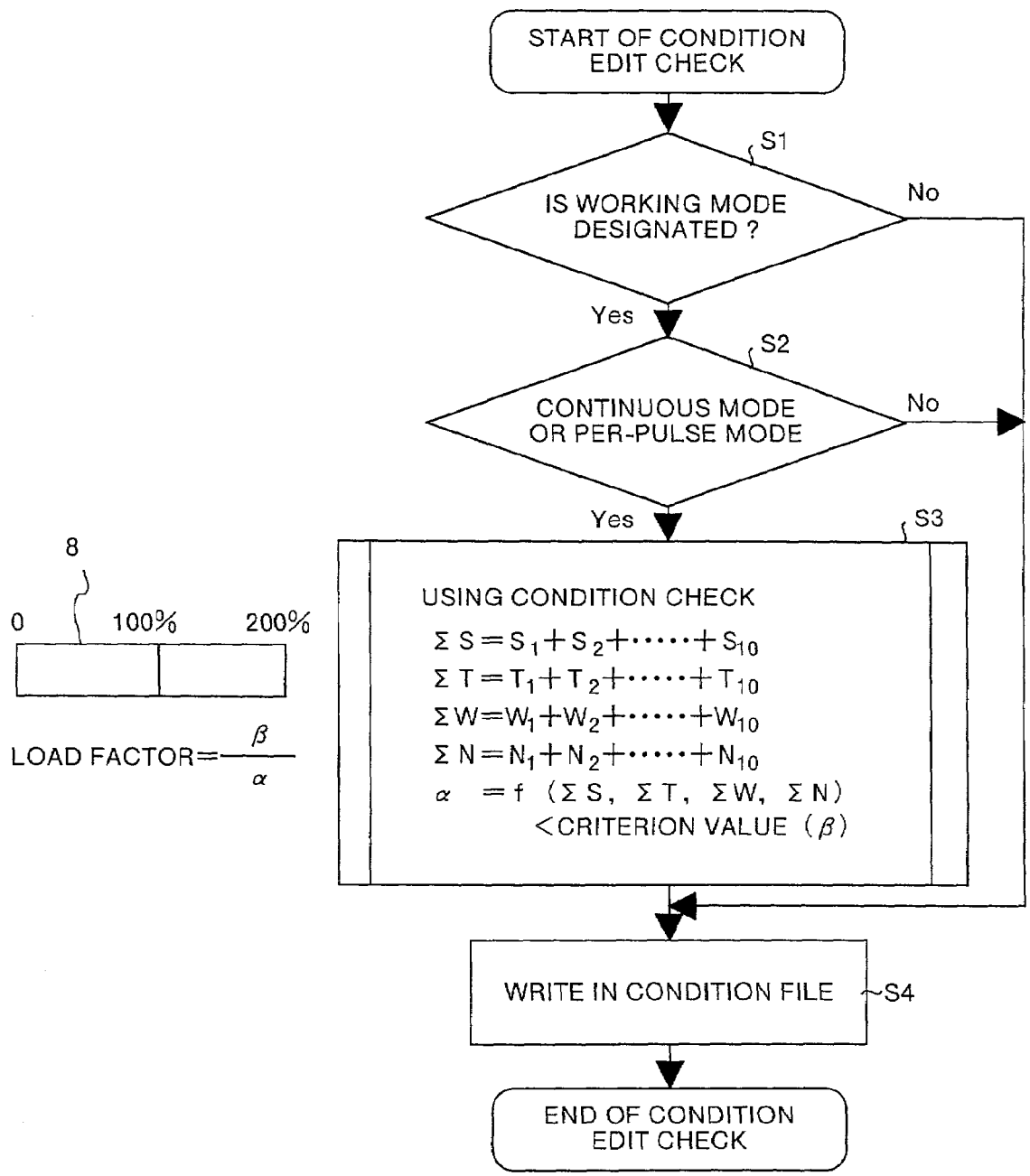
FIG. 4 is a flowchart of an edit check processing of the working condition.

Next procedure for setting the working condition will be explained. When the working condition is set, the operator sets current value S, frequency T, pulse width W, pulse number N and working mode. If all working conditions have been set, the control device 1 checks the working conditions in each working mode in accordance with a flowchart shown in FIG. 4. FIG. 4 is a flowchart of an edit check processing of the working condition. The edit check processing explained below is realized by executing an edit check processing program stored in the first or second storage media 4, 5 or other computer-readable storage medium.

If the condition edit check processing is started, the control device 1 first judged whether the working mode is designated by the operator (step S1). If the working mode was designated, the control device 1 judges whether this mode may apply a load to the laser oscillator (step S2). For example, in the case of the continuous mode M, the cycle mode C and the per-pulse mode P, a load is applied to the laser oscillator in the continuous mode M and the per-pulse mode P, and almost no load is applied in the cycle mode C.

Therefore, if the working mode is the continuous mode M or the per-pulse mode P in step S2, the procedure is proceeded to step S3, and the load factor of the laser oscillator 2 is checked with respect to the setting condition of the operator. If the working mode was the cycle mode C, the load factor is not checked. Irrespective of these three working modes, if another laser working pattern is added and there is an adverse possibility that a load is applied to the laser oscillator 2, the load factor of the laser oscillator 2 is checked, and when no load is applied, the load factor is not checked.

In step S3, the control device 1 calculates a total sum $\Sigma S$ of a current value S in accordance with the following equation (1), calculates a total sum $\Sigma T$ of a frequency T in accordance with the following equation (2), calculates a total sum $\Sigma W$ of a pulse width W in accordance with the following equation (3), and calculates a total sum EN of a pulse number N in accordance with the following equation (4). Then, the control device 1 calculates and obtains a laser output $\alpha$ which is expected to be output from the laser oscillator when the working is actually carried out by means of a function f indicated in a predetermined equation (5) based on the total sums $\Sigma S$, $\Sigma T$, $\Sigma W$ and $\Sigma N$ of the current value S, frequency T, pulse width W and pulse number N.

$$\Sigma S = S_1 + S_2 + S_3 + \ldots + S_{10} \quad (1)$$

$$\Sigma T = T1 + T_2 + T_3 + \ldots + T_{10} \quad (2)$$

$$\Sigma W = W1 + W_2 + W_3 + \ldots + W_{10} \quad (3)$$

$$\Sigma N = N1 + N_2 + N_3 + \ldots + N_{10} \quad (4)$$

$$\alpha = f(\Sigma S, \Sigma T, \Sigma W, \Sigma N) \quad (5)$$

Then, the control device 1 calculates and obtains the ratio of $\alpha$ to a predetermined criterion value $\beta$, i.e., a load factor of the laser oscillator 2 in accordance with the following equation (6). Here, a value of $\beta$ is a value in which a predetermined safety factor is added to a permissible load of the laser oscillator 2. The control device 1 controls the display of the working condition check bar 8 in accordance with the obtained load factor. With this control, the working condition checkbar 8 of the display device 3 displays an index corresponding to the expected load factor of the laser oscillator 2.

$$\text{load factor} = \beta/\alpha \times 100(\%) \quad (6)$$

The operator checks the working condition check bar 8, and if the indication of the working condition check bar 8 exceeded 100%, the operator changes one or more of current value S, frequency T, pulse width W and pulse number N in the working condition so that the indication of the working condition check bar 8 becomes 100% or lower. If the working condition check bar 8 became 100% or lower, the control device 1 writes a setting condition at that time into the first storage medium 4 as a working condition file (step S4), and the procedure is completed.

According to the above embodiment, when the working condition is set, if the operator inputs the working condition, an expected load factor of the laser oscillator is obtained based on the input working condition, and the load factor is displayed as on the display device 3 as the working condition check bar 8. Therefore, the operator can adjust the working condition so that the load factor of the laser oscillator 2 stays within the predetermined range while watching the working condition check bar 8. Thus, it is possible to prevent an excessive load from being applied to the laser oscillator 2 at the time of actual working, and the operator can easily and swiftly find an appropriate working condition.

Although the holes are bored in the printed-circuit board by the pulse oscillating laser in the above embodiment, the present invention is not limited to this, and the invention can be applied to various other laser working also.

Further, although the continuous mode M, the cycle mode C and the per-pulse mode P are explained and the working condition is subjected to the edit check processing with respect to the continuous mode M and the per-pulse mode P in the above embodiment, the invention is not limited to this, and working conditions of other working patterns can also be controlled in the same manner.

Furthermore, the load factor of the laser oscillator 2 is displayed using the working condition check bar 8 in the above embodiment, but the invention is not limited to this, and any display manner can be accepted only if the operator can check the load factor of the laser oscillator 2, or a voice synthesizing means or the like may inform of the load factor by means of voice.

As explained above, according to the working condition control method of the laser working machine, when the working condition of the laser working machine is set, if an operator inputs the working condition, an expected load of the laser oscillator is obtained based on the input working condition, and the expected load is displayed on the display device. The operator can adjust the working condition so that a load of the laser oscillator stays within a predetermined load range while watching the expected load. Therefore, it is possible to prevent excessive load from being applied to the laser oscillator at the time of actual working and thus, it is possible to restrain the constituent part of the laser oscillator from wearing and deteriorating. Further, the operator can easily and swiftly find an appropriate working condition.

In this working condition control method, the working condition of the laser working machine is determined based on a drive current value of the laser oscillator, frequency, pulse width, pulse number of the laser oscillator and the working mode. Therefore, the expected load of the laser oscillator can be obtained based on the working condition before the working is actually carried out.

In this working condition control method, the expected load of the laser oscillator is obtained based on total sums of the drive current value of the laser oscillator, frequency, pulse width and pulse number of the laser oscillator. Therefore, precise expected load can be obtained, and the operator can easily determine an appropriate working condition.

According to the computer-readable storage medium of the invention, the control device of the laser working machine can read out the program for setting the working condition from the storage medium and can execute the program. With this operation, the expected load of the laser oscillator with respected to the working condition input by the operator is obtained, and the expected load is displayed on the display device. Thus, the operator can adjust the working condition so that a load of the laser oscillator stays within a predetermined load range while watching the expected load. Therefore, it is possible to prevent excessive load from being applied to the laser oscillator at the time of actual working operation and thus, it is possible to restrain the constituent part of the laser oscillator from wearing and deteriorating. Further, the operator can easily and swiftly find an appropriate working condition.

In the program stored in the storage medium, since the working condition of the laser working machine is determined based on the drive current value of the laser oscillator, frequency, pulse width, pulse number and working mode of the laser oscillator, the expected load of the laser oscillator can be obtained based on the working condition before the working is actually carried out.

In the program stored in the storage medium, the expected load of the laser oscillator is obtained based on total sums of the drive current value of the laser oscillator, frequency, pulse width and pulse number of the laser oscillator. Therefore, precise expected load can be obtained, and the operator can easily determine an appropriate working condition.

INDUSTRIAL APPLICABILITY

As described above, in the working condition control method of the laser working machine and the computer-readable storage medium storing the program for the method, the current value S of drive current to be supplied to the laser oscillator, frequency T, pulse width W and pulse number N of pulse oscillation are set. The working condition control method and the computer-readable storage medium are suitable for a laser working machine for boring a printed-circuit board by a pulse oscillating laser for example.

The invention claimed is:

1. A method of controlling working condition/s of a laser working machine by setting the working condition for driving a laser oscillator, the method comprising the steps of:
   inputting the working condition;
   obtaining an expected load of said laser oscillator concerning a condition in which a load may be applied to the laser oscillator with respect to the input working condition; and
   displaying the obtained expected load,
   wherein the working condition includes a working mode for defining a current value for driving the laser oscillator, frequency, pulse width and pulse number of laser output, and an irradiation pattern of laser pulse light to one or more to-be worked portions.

2. The method according to claim 1, wherein the expected load is a function of a total sum of the current value, frequency, pulse width, and the pulse number.

3. A computer readable medium for storing instructions, which when executed on a computer, causes the computer to perform a method of controlling working condition/s of a laser working machine by setting the working condition for driving a laser oscillator, the method comprising the steps of:
   inputting the working condition;
   obtaining an expected load of said laser oscillator concerning a condition in which a load may be applied to the laser oscillator with respect to the input working condition; and
   displaying the obtained expected load,
   wherein the working condition includes a working mode for defining a current value for driving the laser oscillator, frequency, pulse width and pulse number of laser output, and an irradiation pattern of laser pulse light to one or more to-be worked portions.

4. The computer-readable storage medium according to claim 3, wherein the expected load is a function of a total sum of the current value, frequency, pulse width, and the pulse number.

5. A method of controlling a laser oscillator output, the method comprising:
   inputting one or more parameters into a controller that controls the laser oscillator output;
   determining an expected load of said laser oscillator based on values of the one or more inputted parameters;
   displaying the obtained expected load; and
   modifying the values of the one or more inputted parameters based on the displayed expected load,
   wherein the expected load is a function of at least one of, an electrical current value for driving the laser oscillator, a frequency of output pulses of the laser oscillator, a pulse width and a pulse number of the output pulses of the laser oscillator, and an irradiation pattern of the output pulses of the laser oscillator.

6. A method of controlling a laser oscillator output, the method comprising:
   inputting one or more parameters into a controller that controls the laser oscillator output;
   determining an expected load of said laser oscillator based on values of the one or more inputted parameters;
   displaying the obtained expected load; and
   modifying the values of the one or more inputted parameters based on the displayed expected load,
   wherein the expected load is a function of a total sum of at least one of, an electrical current value for driving the laser oscillator, a frequency of the output pulses of the laser oscillator and a pulse width of the output pulses of the laser oscillator.

* * * * *